United States Patent [19]

di Ricco et al.

[11] Patent Number: 4,547,534

[45] Date of Patent: Oct. 15, 1985

[54] METHOD TO DISPERSE FINE SOLIDS WITHOUT SIZE REDUCTION

[75] Inventors: Leo di Ricco, San Jose; Edward Schnee, Byron; Zorro Stefanini, San Jose; Duncan W. Frew, Alamo, all of Calif.

[73] Assignee: Memorex Corporation, Santa Clara, Calif.

[21] Appl. No.: 637,390

[22] Filed: Aug. 3, 1984

Related U.S. Application Data

[63] Continuation-in-part of Ser. No. 477,428, Mar. 18, 1983, abandoned, which is a continuation of Ser. No. 307,320, Sep. 30, 1981, abandoned.

[51] Int. Cl.$^4$ .............................................. C08J 3/20
[52] U.S. Cl. ................................. 523/324; 241/184; 523/223
[58] Field of Search ................ 241/184; 523/223, 318, 523/324, 333, 334

[56] References Cited

U.S. PATENT DOCUMENTS

| | | | |
|---|---|---|---|
| 3,080,319 | 3/1963 | Arrington, Jr. | 252/62.5 |
| 3,634,252 | 1/1972 | Graham | 252/62.54 |
| 3,687,725 | 8/1972 | Hartmann et al. | 117/235 |
| 3,843,404 | 10/1984 | Haefele et al. | 117/235 |
| 3,865,741 | 2/1975 | Sischka | 252/62.54 |
| 3,904,130 | 9/1975 | Delfosse et al. | 241/30 |

*Primary Examiner*—Paul R. Michl
*Attorney, Agent, or Firm*—Limbach, Limbach & Sutton

[57] ABSTRACT

The present invention is a method to disperse fine solids in a resin binder matrix by use of a sand mill having non-metallic discs and containing zirconium oxide milling media. The method of the invention will disperse the fine solids without reduction of the size of the fine solids or contamination to the dispersion by fines of the zirconium oxide milling media.

9 Claims, No Drawings

METHOD TO DISPERSE FINE SOLIDS WITHOUT SIZE REDUCTION

RELATED APPLICATIONS

The present application is a continuation-in-part of U.S. application Ser. No. 477,428, filed on Mar. 18, 1983, abandoned, which is, in turn, a continuation of U.S. application Ser. No 307,320, filed on Sept. 30, 1981, now abandoned.

BACKGROUND OF THE INVENTION

In the past, it has been desirable to provide some means to protect magnetic recording surfaces and give such surfaces a longer useful life. To accomplish this, hard particles were added to the magnetic recording composition or in the form of a finish coating to be applied to a magnetic recording surface to provide abrasion resistance.

The hard particles which were to provide the abrasion resistance had to be of a material which would not interfere with the magnetic qualities of the magnetic recording surface. The materials chosen would have to be non-magnetizable.

The method of applying the hard particles to the magnetic recording surface proved to be a major obstacle. The method used had to provide an abrasive resistant coating which would not damage the magnetic head. To accomplish this it was determined that the hard particles had to be of a uniform size after dispersing to prevent such damage to the magnetic head. If the hard particles were not uniform after dispersing there would be significant uneven magnetic surface wear and possible magnetic head damage.

There have been different methods in the prior art to provide either an abrasion resistant magnetic recording surface or finish coating. The prior methods have not solved the problem of providing an abrasion resistant magnetic recording surface or finish coating in which the hard particles before and after dispersing are substantially the same size, i.e. no size reduction.

For example, U.S. Pat. No. 3,843,404, the teachings of which are incorporated herein by reference, shows milling hard particles and magnetic particles together to form an abrasion resistant magnetic recording surface. However, this method results in a reduction in the size of the hard particles by an unpredictable amount. This reduction results in an abrasion resistant magnetic recording surface having hard particles of non-uniform size creating a non-uniform surface, resulting in the above-mentioned problems.

As indicated in the foregoing, the prior art contemplates different methods of dispersing the hard particles. The milling method which has been primarily used to disperse hard particles for abrasion resistant surfaces has been ball milling, as shown in U.S. Pat. Nos. 3,080,319 and 3,687,725. Ball milling disperses the hard particles, but it also reduces their size. It also causes a reduction in the size of the milling media. When this takes place, the fines from the reduction of the milling media will contaminate the dispersion.

Another milling technique for creating dispersions, as shown in U.S. Pat. No. 3,634,252, is sand milling. The technique of sand milling has been used in the prior art for the dispersion of magnetic pigments, not hard particles. When sand milling has been used to disperse fine solids, the prior art has not shown the use of zirconium oxide as a milling media nor a positive attempt to avoid reduction in the size of the hard particles as well as the size of the milling media.

The object of the invention is to provide a method to disperse abrasive resistant hard particles (fine solids) without size reduction.

A further object of the invention is to provide a method to disperse abrasive resistant hard particles without size reduction in a sand mill and using zirconium oxide milling media producing an abrasive resistant magnetic coating.

Another object of the invention is to provide a method to disperse abrasive resistant hard particles in a resin binder matrix to form a dispersion where the dispersion is not contaminated due to a reduction in the size of the milling media.

A further object of the invention is to provide a method to disperse abrasive resistant hard particles in a resin binder matrix to form a dispersion where the sand mill uses non-metallic discs to disperse the abrasive resistant hard particles in producing an abrasive resistant magnetic coating.

A further object of the invention is to provide a method to disperse abrasive resistant hard particles in a resin binder matrix to form a dispersion and provide a finish coating with uniform sized hard particles and magnetic particles for application to a rigid or flexible magnetic recording surface in producing an abrasive resistant magnetic coating.

A still further object of the invention is to provide an abrasive resistant finish coating for application to flexible or rigid recording surfaces that will not damage magnetic heads.

The present invention overcomes these problems as will be set forth in the following.

SUMMARY OF THE INVENTION

The invention is a method of producing an abrasive resistant magnetic coating comprising dispersing magnetic particles and abrasive resistant hard particles in a slurry containing a resin binder matrix and surfactant by using mill means having a plurality of non-metallic discs and containing a zirconium oxide milling media.

In the method of the invention, a resin binder matrix is mixed with a solvent and the matrix is then filtered and a surfactant is admixed to aid in dispersing the abrasive resistant hard particles. The abrasive resistant hard particles are mixed with the resin binder matrix and surfactant to form a slurry. The slurry is sand milled to form the dispersion.

The sand mill used in practicing the invention possesses non-metallic discs. The milling media to be used is zirconium oxide milling media. When the sand milling process is completed, the abrasive resistant hard particles are dispersed in the resin binder matrix to form the dispersion. The abrasive resistant hard particles in the dispersion are substantially the same size before and after being dispersed. Likewise, the zirconium oxide milling media in the sand mill is also substantially the same size and not reduced in size during the milling process.

DETAILED DESCRIPTION OF THE INVENTION

The method of the present invention provides for the dispersing of abrasive resistant hard particles (fine solids) without reduction in size.

The method contemplates the use of a sand mill having non-metallic discs and containing zirconium oxide milling media to effect the dispersing of the abrasive resistant hard particles.

As an example of abrasive resistant hard particles useful in practicing the invention are ceramic alumina, A-16 SG, commercially available from ALCOA. These hard particles are from a class of materials which are non-magnetizable ground to a uniform size and of high quality in accordance with U.S. Pat. Nos. 3,358,937; 3,432,313; and 3,516,840.

The abrasive resistant hard particles plus resin binder matrix, magnetic particles and surfactant form a slurry which is pumped into the sand mill. As an example of a resin binder matrix is carbitol acetate (diethyleneglycolmonoethylether acetate) with an unfiltered solution of 60% EPON 1004 flakes, commercially available from Shell Chemical Company and 40% cellosolve solvent (ethyleneglycolmonoethylether).

A surfactant should be used to aid in dispersing the abrasive resistant hard particles and Gafac RE-610, commercially available from GAF Corporation can, for example, be used for such a purpose.

The preferred sand mill used in practicing the method is a Morehouse Model 5-5. This sand mill preferably employs discs to effect the dispersing. These discs are preferably constructed of a non-metallic material which would not contaminate the dispersion with metallic fines, such as plastic, nylon 6 (Capron 8207, Allied Chemical); nylon 6/6 (Zytel 131, Dupont); polypropylene (Marlex HGZ-50, Phillips Petroleum); UHMUD Polyethylene (Marlex EHM 6001, Phillips Petroleum); and polyurethane (Pellethane 2102, Upjohn).

The preferred sand milling media is composed of zirconium oxide. As an example of appropriate zirconium oxide media is Zirbeads commercially available from ZIRCOA Products, Ceramic Products Division, Corning Glass Works. The Zirbeads which were found acceptable are −10 to +20 mesh and average approximately 1 millimeter in diameter. Their composition is 98% $ZrO_2$, 1.0% $Al_2O_3$ and 1.0% MgO and other trace elements with a hardness of 8-9 on the MOH scale.

Generally, sand milling will not reduce the size of the abrasive resistant hard particles if their hardness is less than that of the sand milling media. However, if the abrasive resistant hard particles display a hardness greater than the sand milling media, the latter may be reduced in size and cause metallic fines to contaminate the dispersion.

Zirconium oxide milling media has proven to be quite hard and has exhibited the exceptional quality of not reducing in size during the sand milling process. Other milling media with a hardness greater than the employed fine solids was tested, however, none exhibited the qualities of zirconium oxide to resist size reduction. Surprisingly, the use of zirconium oxide media results in the lowest amount of contamination to the dispersion.

The method of the invention is represented by the following example.

EXAMPLE

The slurry containing Gafac RE-610, Carbitol Acetate, unfiltered E intermediate solution and A-SG16 (alumina) is introduced to one side of the sand milling apparatus having plastic discs and containing Zirbeads. The slurry is agitated the entire time while being pumped into the sand mill.

The blades used to agitate the slurry should also preferably be constructed of a non-metallic material to prevent contamination by metallic fines. Cooling water is circulated around the sand milling vessel to maintain a mill temperature of 30°-35° C. The slurry is pumped into the milling vessel until a drain comes from the discharge pipe at the top of the vessel. The pump speed can be adjusted to maintain a drain flow rate of 15 liters per hour. The mill is purged for about 30 minutes or until about 2 gallons of drain is collected which is returned to the original slurry which in turn is pumped for a first pass drain, where dispersing of the hard particles takes place.

This procedure is repeated for a second and third pass to complete dispersing of the abrasive resistant hard particles. The dispersion is added to magnetic particles and applied to a flexible or rigid surface producing an abrasive resistant magnetic coating. Virtually any magnetic particle can be used in practicing the present invention, such as those disclosed in U.S. Pat. No. 3,843,404, the teachings of which are incorporated herein by reference.

We claim:

1. A method of producing an abrasive resistant magnetic coating comprising dispersing magnetic particles and abrasive resistant hard particles in a slurry containing a resin binder matrix and surfactant by using mill means having a plurality of non-metallic discs and containing a zirconium oxide milling media.

2. The method of claim 1 wherein the abrasive resistant hard particles maintain substantially the same size before and after milling.

3. The method of claim 1 wherein the hardness of the zirconium oxide milling media is greater than the hardness of the abrasive resistant hard particles.

4. The method of claim 1 wherein the non-metallic discs are constructed of plastic, polypropylene, polyethylene, nylon or polyurethane.

5. The method of claim 1 wherein the mill means is a sand mill.

6. The method of claim 1 wherein the zirconium oxide milling media is approximately −10 to +20 mesh in size.

7. The method of claim 1 wherein the abrasive resistant hard particles comprise ceramic alumina.

8. The method of claim 1 wherein the zirconium oxide milling media maintains substantially the same size before and after dispersing the fine solids.

9. A method of producing a finished coating with uniform sized hard particles for application to a rigid or flexible magnetic recording surface comprising dispensing magnetic particles and hard particles in a slurry containing a resin binder matrix and surfactant by using mill means having a plurality of non-magnetic discs and containing a zirconium oxide milling media.

* * * * *